United States Patent
Shin

(10) Patent No.: US 11,290,614 B2
(45) Date of Patent: Mar. 29, 2022

(54) AUTOMATIC GROUPING METHOD IN WEB BASED DEVICE MANAGEMENT APPLICATIONS USING UNSUPERVISED MACHINE LEARNING ALGORITHM

(71) Applicant: Xerox Corporation, Norwalk, CT (US)

(72) Inventor: Helen HaeKyung Shin, Fairport, NY (US)

(73) Assignee: XEROX CORPORATION, Norwalk, CT (US)

(*) Notice: Subject to any disclaimer, the term of this patent is extended or adjusted under 35 U.S.C. 154(b) by 340 days.

(21) Appl. No.: 15/691,923

(22) Filed: Aug. 31, 2017

(65) Prior Publication Data
US 2019/0068827 A1    Feb. 28, 2019

(51) Int. Cl.
*H04N 1/00* (2006.01)
*H04N 1/32* (2006.01)

(52) U.S. Cl.
CPC ..... *H04N 1/32662* (2013.01); *H04N 1/32032* (2013.01); *H04N 2201/0072* (2013.01); *H04N 2201/3202* (2013.01); *H04N 2201/3273* (2013.01); *H04N 2201/3284* (2013.01)

(58) Field of Classification Search
CPC .................................................. H04N 1/32662
See application file for complete search history.

(56) References Cited

U.S. PATENT DOCUMENTS

| | | | |
|---|---|---|---|
| 8,117,486 B2 | 2/2012 | Handley | |
| 8,234,138 B2 | 7/2012 | Handley et al. | |
| 8,290,884 B2 | 10/2012 | Brdiczka et al. | |
| 8,462,368 B2* | 6/2013 | Osadchyy | H04L 41/22 358/1.15 |
| 8,468,527 B2 | 6/2013 | Rai | |
| 8,965,816 B2 | 2/2015 | Okamoto | |
| 2003/0229691 A1* | 12/2003 | Ishimoto | H04L 51/30 709/223 |
| 2004/0252329 A1* | 12/2004 | Sorenson | H04L 43/0817 358/1.15 |
| 2012/0002981 A1* | 1/2012 | Park | H04N 1/00344 399/8 |
| 2016/0219102 A1* | 7/2016 | Nakajima | H04L 41/28 |
| 2016/0371245 A1* | 12/2016 | Hamilton | G06F 16/215 |

* cited by examiner

*Primary Examiner* — Benjamin O Dulaney
(74) *Attorney, Agent, or Firm* — Fay Sharpe LLP

(57) ABSTRACT

In order to automatically group or cluster printing devices in a fleet of such devices for servicing, print status data and print state data are received, which comprises alert information for each of the plurality of printing devices, from each of a plurality of printing devices in a fleet of devices. Devices with similar print statuses and alerts are automatically clustered, and the clustered output result displayed on a user interface of a device management application (DMA). The clustered output result is also integrated into the DMA, and a print status alert module generates automated print status alerts for printers identified during clustering. The automated print status alerts are then output for display on the user interface.

21 Claims, 16 Drawing Sheets

| | | | | |
|---|---|---|---|---|
| ⊗ | Intervention Required | 13.121.238.55 | Network Printer | Xerox WorkCentre 7665 v1 Multifunction System | VDR538389 |
| ⊗ | No answer from device | 13.121.238.58 | Network Printer | Xerox WorkCentre 5632 v1 Multifunction System | WRT614417 |
| ⊗ | Out of Paper | 13.121.238.194 | Network Printer | Xerox Phaser 6200 DP | XXXXXXXX |
| ⊗ | Intervention Required | 13.121.238.57 | Network Printer | Xerox ColorQube 9201 | 804000268 |
| ⊗ | Paper Jammed | 13.121.237.197 | Network Printer | HP LaserJet M4345 MFP | CNCC6C240T |
| ⚠ | Intervention Required | 13.121.238.64 | Network Printer | Xerox WorkCentre Pro 245 | UTT852090 |
| ⚠ | Paper Jammed | 13.121.238.48 | Network Printer | Xerox WorkCentre 4260 | MFG:Xerox;CMD:PC |
| ⚠ | Toner/Ink Low | 13.121.238.49 | Network Printer | Xerox WorkCentre 7132 | 3310920010 |
| ⚠ | Intervention Required | 13.121.238.11 | Network Printer | Xerox WorkCentre 7245 | 3521800282 |
| ⚠ | Low Paper | 13.121.238.51 | Network Printer | Xerox WorkCentre 7755 v1 Multifunction System | VDR535610 |
| ⚠ | Toner/Ink Low | 13.121.238.54 | Network Printer | Xerox Phaser 6280N | 000000000 |
| ⚠ | Consumable Missing | 13.121.238.118 | Network Printer | Xerox Phaser 6180MFP-N | GNX113971 |
| ⚠ | Intervention Required | 13.121.238.53 | Network Printer | Xerox WorkCentre 4250 | B1DQB00010 |
| ✓ | Up and Running | 13.121.238.60 | Network Printer | Lexmark Optra S 2455 | 11HAX37 |
| ✓ | Up and Running | 13.121.238.50 | Network Printer | Xerox Phaser 7500DX | XRX456789 |
| ✓ | Up and Running | 13.121.238.13 | Network Printer | HP LaserJet 4000 Series | USNC046069 |
| ✓ | Up and Running | 13.121.238.46 | Network Printer | Xerox WorkCentre 5225 | KBM524010 |

FIG. 2

▽ Printer Status

General Status

| | |
|---|---|
| Status Age | |
| Status Date | 6/8/2009 2:45:17 PM |
| Last Status Attempt | 6/8/2009 2:45:17 PM |
| Machine Up Time | 45 Day(s) 6 Hour(s) 51 Minute(s) 59 seconds |

⚠ Functioning but has one or more warnings
⚠ Warnings: Consumable Missing, Input Tray Empty, Output Tray Missing

Supplies Status

None

Supplies Status

| | Skill Level | Description | Time (Age) |
|---|---|---|---|
| ⚠ | Trained | 093-423: Yellow print cartridge near end of life. Replace Yellow print cartridge soon. Printer is able to print. | 4/28/2009 8:33:11 PM 40 Day(s) 18 Hour(s) 12 Minute(s) 5 seconds |
| ⚠ | Trained | 093-426: Black print cartridge near end of life. Replace Black print cartridge soon. Printer is able to print. | 4/28/2009 8:33:11 PM 40 Day(s) 18 Hour(s) 12 Minute(s) 5 seconds |
| ✓ | Untrained | Power Saver. No intervention required. Printer will wake up when user sends a print job or by pressing the Power Saver button. Printer status may not be valid when engine is turned off. | 4/28/2009 8:33:11 PM 40 Day(s) 18 Hour(s) 12 Minute(s) 5 seconds |

| | |
|---|---|
| Traps Supported | Yes |
| Traps Enabled [1] | No |

FIG. 3

FIG. 6 ained in US 11,290,614 B2

AUTOMATIC GROUPING METHOD IN WEB BASED DEVICE MANAGEMENT APPLICATIONS USING UNSUPERVISED MACHINE LEARNING ALGORITHM

TECHNICAL FIELD

The presently disclosed embodiments are directed toward printing device management systems. However, it is to be appreciated that the present exemplary embodiments are also amenable to other like applications.

BACKGROUND

Conventional Device Management Applications (DMAs) are installed to manage devices such as printers or multi-function devices in web based environment. Such applications allow users to discover devices and collect data from the device on a scheduled basis and display information via a network discovery protocol.

Some printers can be manually grouped by the category chosen by a user. Users create groups based on their knowledge of the fleet they are managing (top down). Grouping based on various printer statuses does not exist in conventional systems. That is, existing device grouping approaches do not provide any means of extracting data for automatically grouping printers based on historical polling data.

There is a need in the art for systems and methods that facilitate automatically grouping devices within a fleet according to extracted status and state information in order to improve fleet health and mitigate false alerts, while overcoming the aforementioned deficiencies.

BRIEF DESCRIPTION

In one aspect, a method for automatically grouping print status alerts for a plurality of printing devices comprises receiving print status data and print state data, which comprises alert information for each of the plurality of printing devices, from each of a plurality of printing devices in a fleet of devices, and automatically clustering devices with similar print statuses and alerts. The method further comprises displaying the clustered output result on a user interface of a device management application (DMA), integrating the clustered output result into the DMA, executing a print status alert module that generates automated print status alerts for printers identified during clustering, and outputting the automated print status alerts for display on the user interface.

In another aspect, a system that facilitates automatically grouping print status alerts for a plurality of printing devices comprises a remote print status and print state information extraction module configured to receive print status data and print state data from each of a plurality of printing devices in a fleet of devices, an automatic grouping module that automatically clusters devices having similar print statuses and alerts, and a user interface configured to display a clustered output result. The system further comprises a processor configured to integrate the clustered output result into a device management application (DMA), execute a print status alert module that generates clustered print status alerts for printers identified during clustering, and output the clustered print status alerts for display on the user interface.

In another aspect, a processor is configured to automatically group print status alerts for a plurality of printing devices, the processor being configured to receive print status data and print state data, which comprises alert information for each of the plurality of printing devices, from each of a plurality of printing devices in a fleet of devices, automatically cluster devices with similar print statuses and alerts, and display the clustered output result on a user interface of the device management application (DMA). The processor is further configured to integrate the clustered output result into the DMA, execute a print status alert module that generates automated print status alerts for printers identified during clustering, output the automated print status alerts for display on the user interface.

BRIEF DESCRIPTION OF THE DRAWINGS

The embodiments disclosed herein will be better understood from the following detailed description with reference to the drawings, which are not necessarily drawn to scale and in which:

FIG. 2 shows a screen shot illustrating an example of a list view of device status in a device manager such as Xerox Device Manager (XDM), in accordance with one or more features described herein.

FIG. 3 shows a screenshot illustrating an example of detailed print status and alerts in XDM, in accordance with one or more features described herein.

FIG. 6 shows a screenshot of a list view of devices with no toner/ink status in XDM, wherein the clustering output result lists printers with similar printer status.

DETAILED DESCRIPTION

Figure 1:
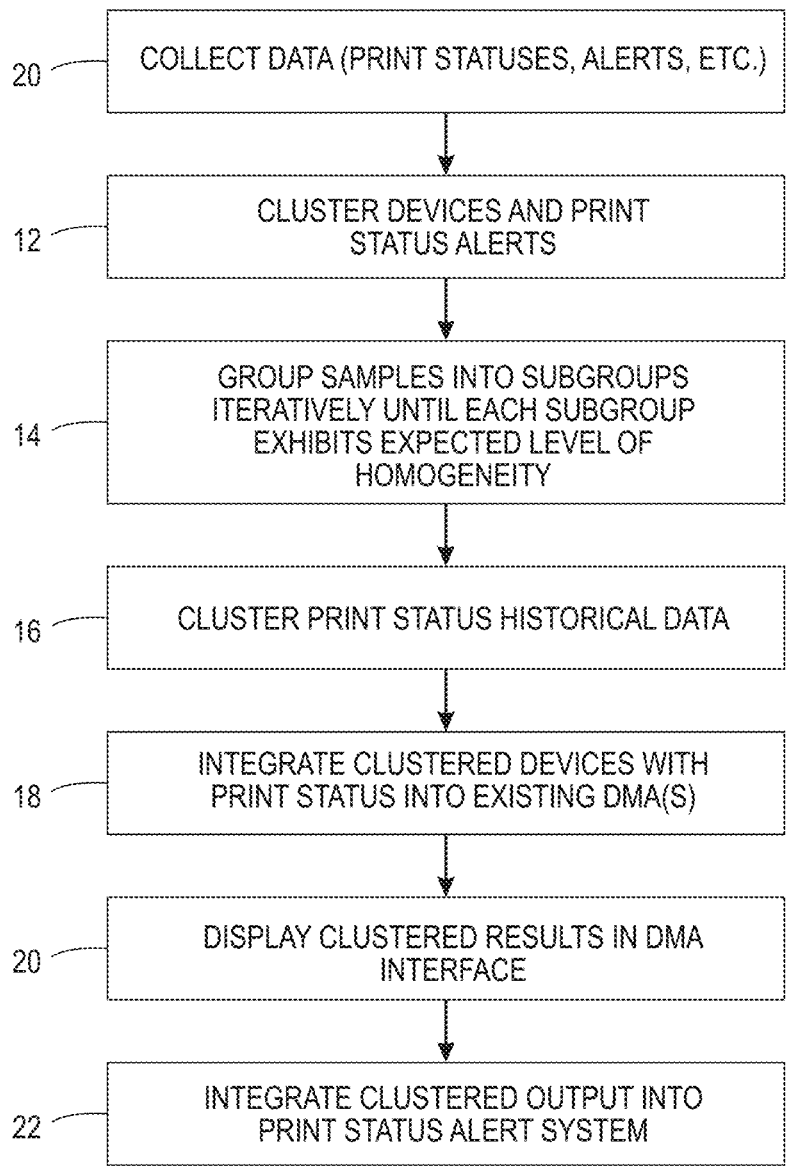
FIG. 1 illustrates a hierarchical block clustering method, which facilitates clustering of printers based on one or both of the fleet of print status data and the historical print status data collected in web based environment.

The embodiments of the invention and the various features and advantageous details thereof are explained more fully with reference to the non-limiting embodiments that are illustrated in the accompanying drawings and detailed in the following description.

The aforementioned problems are solved by an automatic printer grouping method and system utilizing an unsupervised machine learning technique to allow users to have a dynamic and intuitive view of the fleet of devices and their performance. This bottom up approach also provides customer service engineers (CSEs) with a better handling of printer alerts and service calls.

Existing device management systems do not automatically group devices within a fleet according to their performance. The described systems and methods automatically generate a group or subgroups of devices with similar print statuses and alert levels using the fleet of print status data collected in digital management applications (DMAs). Using this automatic grouping method, a user is presented with a dynamic view of the fleet of printer groups that have similar print status or performance levels. In this bottom up approach, users are provided much better understanding of the performance of the fleet of devices that they are managing.

Print status data includes all possible status of the printer. For instance, status data collected from each device includes device configuration, settings, meters (usage numbers, such as number of printed sheets, etc.), supply levels and alerts. Print status is available to users through an alerts system. Example of print status alerts are described in Table1. Based on the print status and alerts, each printer can be categorized as being in a particular print state such as "error," "warning," "okay," "upandRunning," etc. When a printer is in an error state, the user can check the status of the device. The alerts shown in the user interface help the user to track down the status of the device and the corresponding state. Additionally, the same print statuses and alerts can result in different printer states for different printers. For example, low toner alerts can result in an error printer state or warning printer state depending on the other printer statuses involved.

According to one aspect, the described systems and methods automatically generate a group or groups of devices with the similar print status and alert levels over a certain period of time using historical data. The automatic grouping of print status and alerts utilizes unsupervised machine learning technique such as hierarchical block clustering.

The described proposed clustering method is not limited to print status diagnostics in device management systems, such as Xerox Device Manager (XDM) or the like. Although the following description discusses XDM as an example of a device manager application in which the described systems and methods may be employed, it will be understood that the described systems and methods are not limited to XDM and may be employed in any suitable device manager application. The described method can be extended many different use cases in DMAs to provide overall performance and summary view of any chosen areas in DMA. Some use cases of this automatic grouping method in XDM include, without limitation: a) A user may utilize this clustered subgroup of devices with a specific print status alert for the further processing; b) CSE may utilize such clustered groups of devices with similar print status for their service strategy; c) The clustered output can be used as a device filtering option in device alert systems in XDM or Xerox Services Manager (XSM).

Conventional DMAs have no control over the printer status alerts and only use this data to determine if the device is in one of these error states. When the device has a problem in the logic or in the firmware to determine the status of the device, false alerts will be collected in DMAs and the user might get the false alarm. Some devices remove existing error status from its list of errors when other errors occur in the devices. This is a well-known problem in devices which cycle print status bits or print status strings. These types of symptoms can cause unwanted alerts or notifications. The herein-described clustering techniques use historical print status data to detect this type of false alert.

FIG. 1 illustrates a hierarchical block clustering method, which facilitates clustering of printers based on one or both of the fleet of print status data and the historical print status data collected in web based environment. At 10, device status and state data is collected. Print status and alerts are retrieved from the device on scheduled configurable intervals and stored in a printer database or a central knowledge base. At 12, clustering of devices and print status alerts is performed concurrently and permutes the data into homogeneous clusters. The clustering of devices is performed utilizing a simultaneous clustering method. The simultaneous clustering method creates an adjacency matrix representing a relationship between rows and columns of a table as described in Table 2. The method applies a clustering algorithm to the table which contains two sets of different data, in this case different devices are in rows and device related status data are in columns to identify a first set of clusters. The clustering method is further operative to compute for each identified cluster a dispersion value of the cluster. For the each identified cluster, the method compares the dispersion value to a predetermined threshold or clustering quality measure. The method continues applying the algorithm to the set of non-homogenous clusters within the data set to recluster the clusters. The system computes the dispersion value and the repeats the thresholding processes until each cluster resulting from the data set is homogeneous.

After all samples are grouped into subgroups, the additional permutations are performed iteratively at 14 until each subgroup achieves the expected level of homogeneity as defined by a predetermined threshold value that determines the homogeneity of clusters in each group. At 16, clustering of Print Status of historical data is performed. The clustering of print status of a given device is performed to diagnose any possible false alerts. At 18, clustered devices are integrated with print status into existing DMAs. The clustered result is displayed in DMAs user interface to notify users, at 20. For example, the performance of a fleet of devices and the performance of the selected models over a period of time against types of alerts and their occurrences can be summarized by each subgroup. At 22, the clustered output is integrated into a print status alert system in DMAs for an intelligent status alert filtering operation. In one embodiment, the input to the clustering module from 12 includes print statuses for any specific device or for multiple devices. The described clustering method can be integrated in print status applications to many different use cases in DMAs.

The data collected from the devices includes device configuration, settings, meters, supply levels and alerts. Among the data collected, the printer status is retrieved at scheduled configurable intervals. The status updates combine device alerts retrieved from the printer or upon configured traps from the printers. Table 1 below illustrates an example of standard alerts that may be defined by a printer, and contained in Printer Management Information Base (MIB). In this example, each print status type is classified as a different print alert state. The state classification is solely defined by the device.

TABLE 1

Examples of standard printer alerts (in hexadecimal) defined by the device and listed in the order of priority defined by XDM program. Several printer state levels are also listed at the end of the table.

| | | |
|---|---|---|
| NoResponse | InputTrayMissing | QueueManualFeed |
| 0x4000000 | 0x8000 | 0x200000000 |
| TechDispatchReq | OverduePreventMaintenance | QueuePagePunt |
| 0x80000000000 | 0x200 | 0x8000000000 |
| Paperjam | TonerLow | |
| 0x04 | 0x20 | |
| NoToner | LowPaper | Printer State List |
| 0x10 | 0x80 | |
| MarkerSupplyMissing | OutputNearFull | Error |
| 0x2000 | 0x1000 | 0x100000 |
| NoPaper | OfflineOnly | Printing |
| 0x40 | 0x20000000 | 0x1000000 |
| OutputFull | UnspecWarn | Unspecified |
| 0x800 | 0x8000000 | 0x10000 |
| OutputTrayMissing | QueueAccessDenied | Testing |
| 0x4000 | 0x40000000000 | 0x80000 |
| DoorOpen | QueueNoMemory | |
| 0x08 | 0x20000000000 | |
| ServiceRequested | QueuePaused | Warning |
| 0x01 | 0X80000000 | 0x40000 |
| OfflineServiceRequested | QueuePaperProblem | Warmingup |
| 0x40000000 | 0x4000000000 | 0x2000000 |
| UnspecError | QueueWaiting | UpAndRunning |
| 0x10000000 | 0x2000000000 | 0x20000 |
| Offline | QueueIntervention | |
| 0x02 | 0x10000000000 | |
| InputTrayEmpty | QueuePaperProblem | |
| 0x400 | 0x400000000 | |

FIG. 2 shows a screen shot 50 illustrating an example of a list view of device status in XDM, in accordance with one or more features described herein. Print status indicators 51 show the print status severity (error state (red), warning state (yellow), normal state (green)).

FIG. 3 shows a screenshot 60 illustrating an example of detailed print status and alerts in XDM, in accordance with one or more features described herein.

Figure 4:
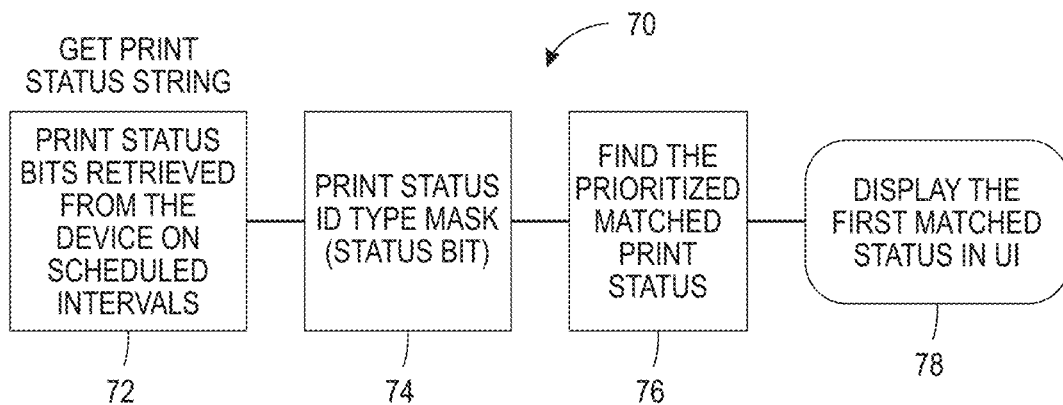
FIG. 4 illustrates a method for implementing a Get Print Status String.

FIG. 4 illustrates a method 70 for implementing a Get Print Status String. As shown at first block in Get Print Status String routine, at 72, an operation is implemented wherein print status bits are retrieved from the device on scheduled intervals and the print status is prioritized. At 74, a print status ID type mask (e.g., status bit) is pre-generated. That is, a list of print status ID masks is pre-generated. At 76, all matched print status bits are identified. Among these, the first matched print status is identified and displayed, at 78. This priority list is defined in global settings (GS) in XDM and the priority is determined by the business strategy. The print status list prioritized in GS is shown in Table 1.

Figure 5:
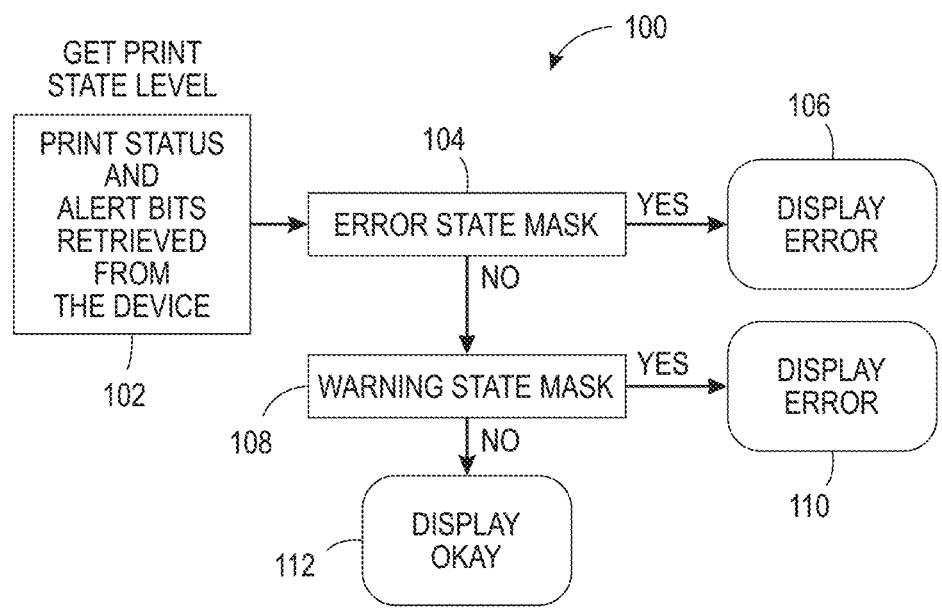
FIG. 5 illustrates a method for generating Get Print State Level in XDM, in accordance with one or more aspects described herein.

FIG. 5 illustrates a method 100 for generating Get Print State Level in XDM, in accordance with one or more aspects described herein. At 102, print status bits are retrieved from the device, followed by a determination of whether or not to generate an indication of an error state, warning state or normal state. At 104, the print status is compared to an error state mask. If the comparison indicates that the print status shows an error, then the error indication is displayed at 106. If not, then at 108, the print status is compared to a warning state mask. If the comparison indicates that the print status shows a warning, then the warning indication is displayed at 110. If the print status does not match either of the warning state mask or the error state mask, then at 112, a normal or "okay" status indication is displayed. The state masks are pre-generated, meaning that XDM has a predetermined status for each state. The method thus facilitates matching print status against the predefined masks.

If the match is found with the error mask, it is assigned as an error. The same is true with respect to a warning state. For example, when the printer status bit of "ServiceRequired", "LowToner", "LowPaper" and "Warning" are received from the device, the XDM UI will display the message of "ServiceRequired" since this indication has priority over other status bits. In this case, the alert level is recorded as a warning state according to the printer status received from the device. As shown in FIG. 2, some devices show this status alert as an error state while some devices show this as a warning state.

Figure 6:
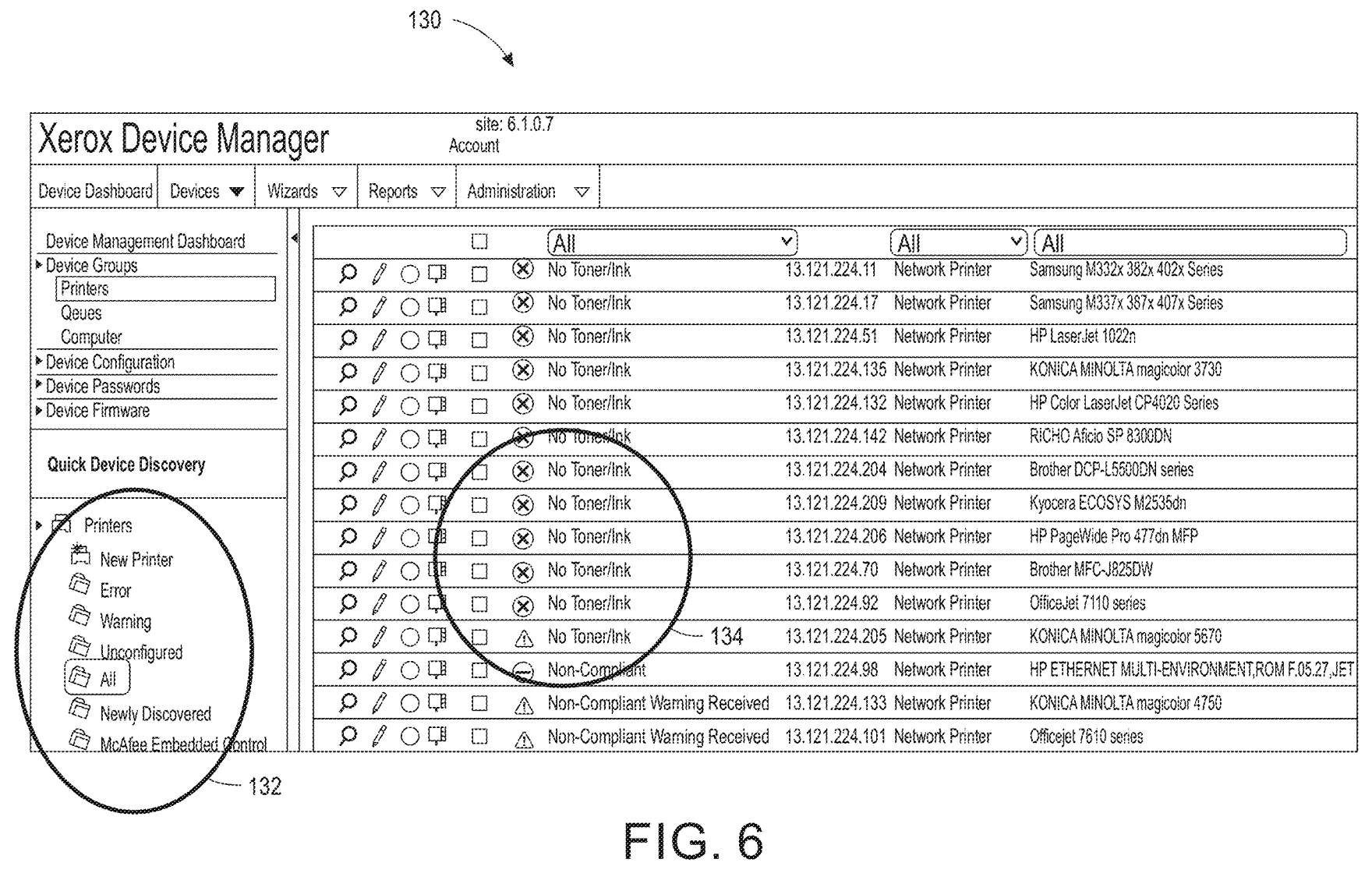

FIG. 6 shows a screenshot 130 of a list view of devices 132 with no toner/ink status 134 in XDM, wherein the clustering output result lists printers with similar printer status. The same status for "No Toner/Ink" is shown for different printers that show different severity levels or states (e.g., error, warning, etc.). As shown in tree view of print groups in FIG. 4 (in red circle), some of printers are grouped based on the severity levels at the scheduled polling intervals described in FIG. 5 (e.g. Error and Warning). In this case, it will be helpful to keep track of historical print status of printers and group the print status based on the historical data for the better diagnostics of status.

Figure 7:
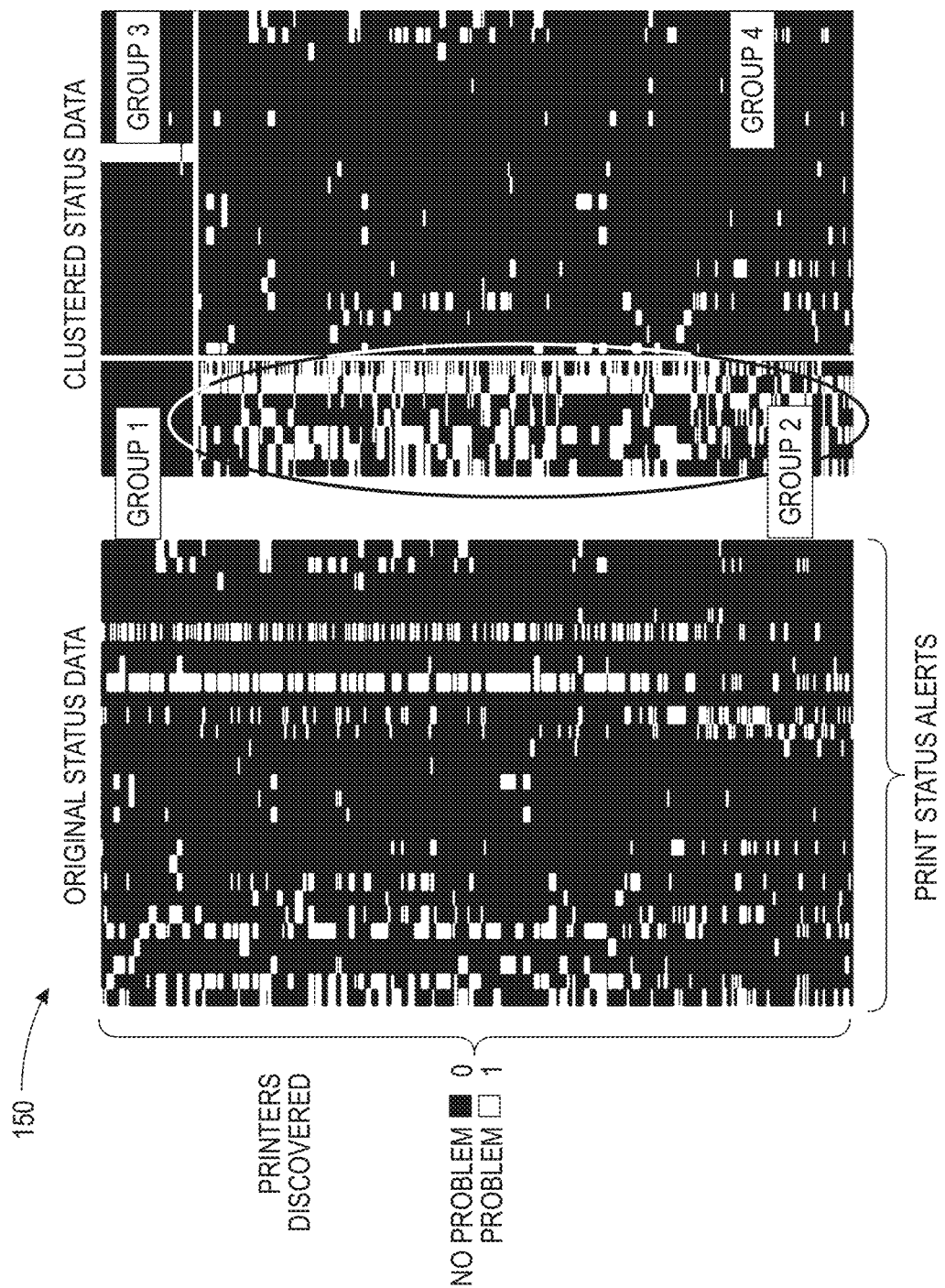
FIG. 7 illustrates an example of clustering result in a fleet of devices; before (left) and after (right) automatic grouping of print status alerts data shown in table 2.

FIG. 7 illustrates an example 150 of a clustering result of the before (left) and the after (right) automatic grouping of print status alerts with a fleet of devices. The top five frequent print status alerts belong to printers in subgroup 2 and the rest of print status alerts belong to the printers in subgroup 4. The statistics of print status alerts in different clustered output can be summarized and displayed in different styles of views in XDM (e.g. Dashboard view or Graphical view). After the original group is clustered globally, the additional permutations can be done until all subgroups within the group reach the expected level of homogeneity as defined by the clustering quality measure. Such hierarchical block clustering also allows flexible boundaries between the adjacent clusters as described in US 20170116316 A1 (Latent student clustering using a hierarchical block clustering method), where is hereby incorporated by reference herein in its entirety. The hierarchical block clustering method finds the homogeneity in clusters by creating at least one adjacency matrix representing a relationship between rows and columns of a table. The method applies an algorithm to the table to identify a first set of clusters. For each identified cluster, the system compares a computed dispersion value to a predetermined threshold. The cluster is associated as being homogeneous if the threshold is not met and not homogeneous if the threshold is met. The module continues applying the algorithm to the set of non-homogenous clusters within the data set and repeats the thresholding processes until each cluster resulting from the data set is homogeneous.

The clustering output on the left represents the original data shown in Table 2 while the output in the right represents the groups after the clustering is complete. In this figure, the rows in both outputs represent devices, and the columns represent the category of print status alerts. The black cells in this example represent 0, which means the status alert is turned off, while the white cells represent 1, which means the status alert is turned on. This block clustering algorithm considers devices and print status alerts of corresponding devices simultaneously, and permutes the data into subgroups with similar print status alerts. In this example, as shown in the clustered status output on the right, four subgroups of printers are generated after the clustering is complete. Each subgroup illustrates printers with similar print status and the frequency of the status. From this clustering result, the user can easily identify the group of printers with similar print status alerts without any prior knowledge of the fleet of printers. This result in turn allows a user to have an insight of the group of printers with different performance levels. In this example, the user may first examine printers in subgroup 2 and 4 to identify the fleet of print status alerts. It is also noted that the frequency of these alerts in printers in subgroup 4 is much lower than the frequency of printer status alerts in subgroup 2. Looking at this further, it is noted that the print status alerts that frequently occur in subgroup 2 include 'service required', 'offline', 'no toner', 'low toner' and 'no response' while the print status alerts in subgroup 4 include 'paper jam', 'door open', 'no paper', 'low paper', etc. Print status alerts in subgroup 1 and 3 are mostly turned off except 'up and running' and 'printing'. Therefore, the user may treat these subgroups of printers differently than those in subgroup 2 and 4.

XDM database that store print status and alerts. After the grouping of the print statuses is performed, printers are grouped based on different print status (see FIG. 7).

Figure 8:
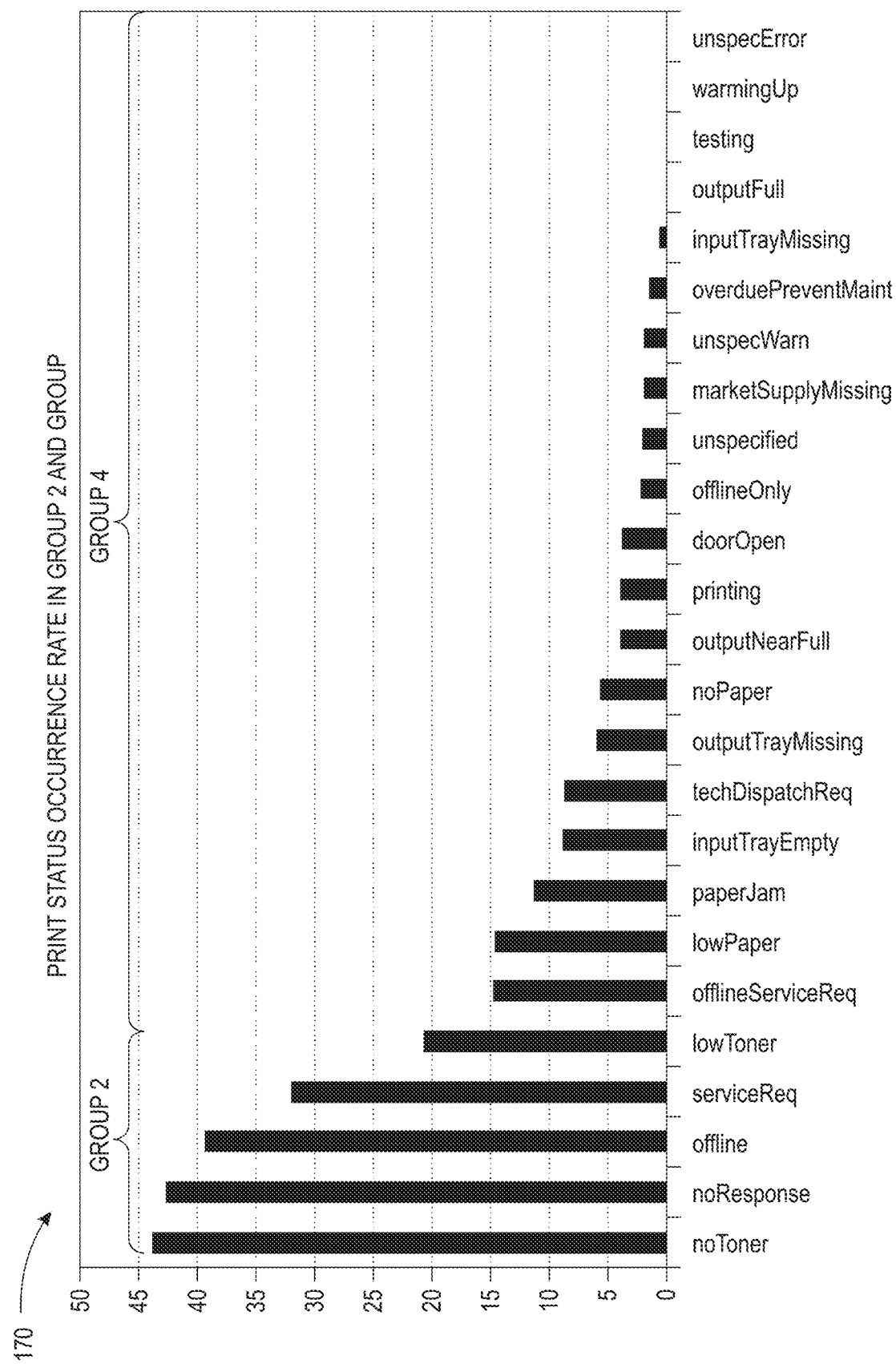
FIG. 8 shows a depiction of status alerts rate (sorted by frequency) in subgroups generated using a plurality of printers such as is shown in Table 2.

FIG. 8 shows that the printers with similar problems are grouped together after clustering is performed. This illustrates that the clustered output is meaningful. Based on the status and alerts, XDM triggers different alert levels to XSM. Device Remote Alert (DRA) systems in XSM trigger different levels of service such as "send an email" or "dispatch service representative" depending on the level of severity at hand. As described in user cases of such clustering output in XDM, a user can break this clustered group of printers into subgroups with a specific print status alert(s) as shown in FIG. 8. Furthermore, the clustering output groups the printers with different severity levels. Printers in subgroup 2 in FIG. 7 show the print status with a higher alert level (error state) than printers in subgroup 4 (warning or normal state). Looking at the result of the clusters, the CSE can look at problems in subgroup 2 for an urgent solution while other groups of printers can be placed in low priority. The CSE can also examine the clustered groups with similar print status for their service strategy. The clusters produced are meaningful and useful. All clustered output is generated automatically using a machine learning technique based on the fleet of printer data without any human intervention.

Figure 9:
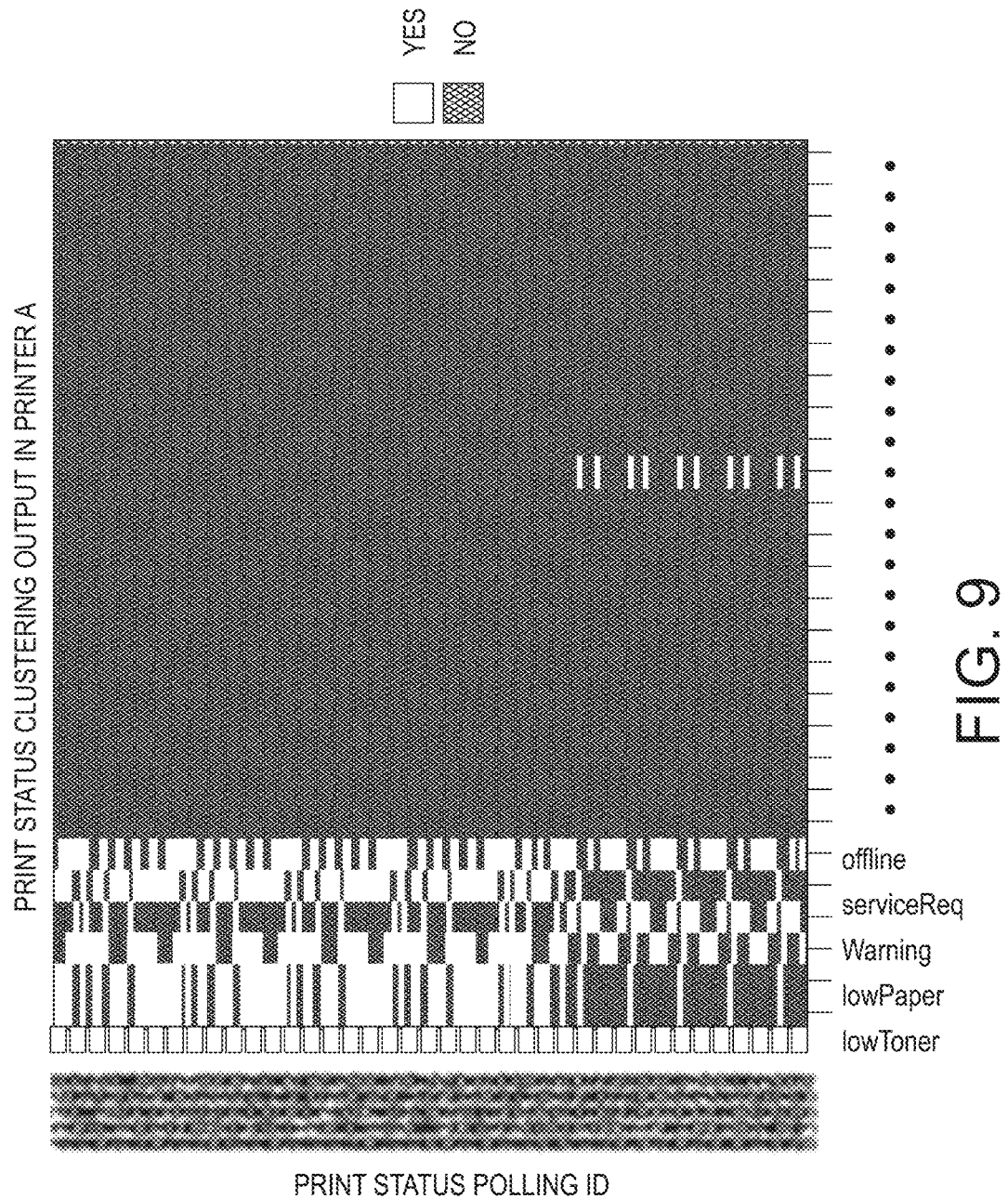
FIG. 9 illustrates an example of a clustering applied to diagnose the cycled print status problem in a printer.
Figure 10:
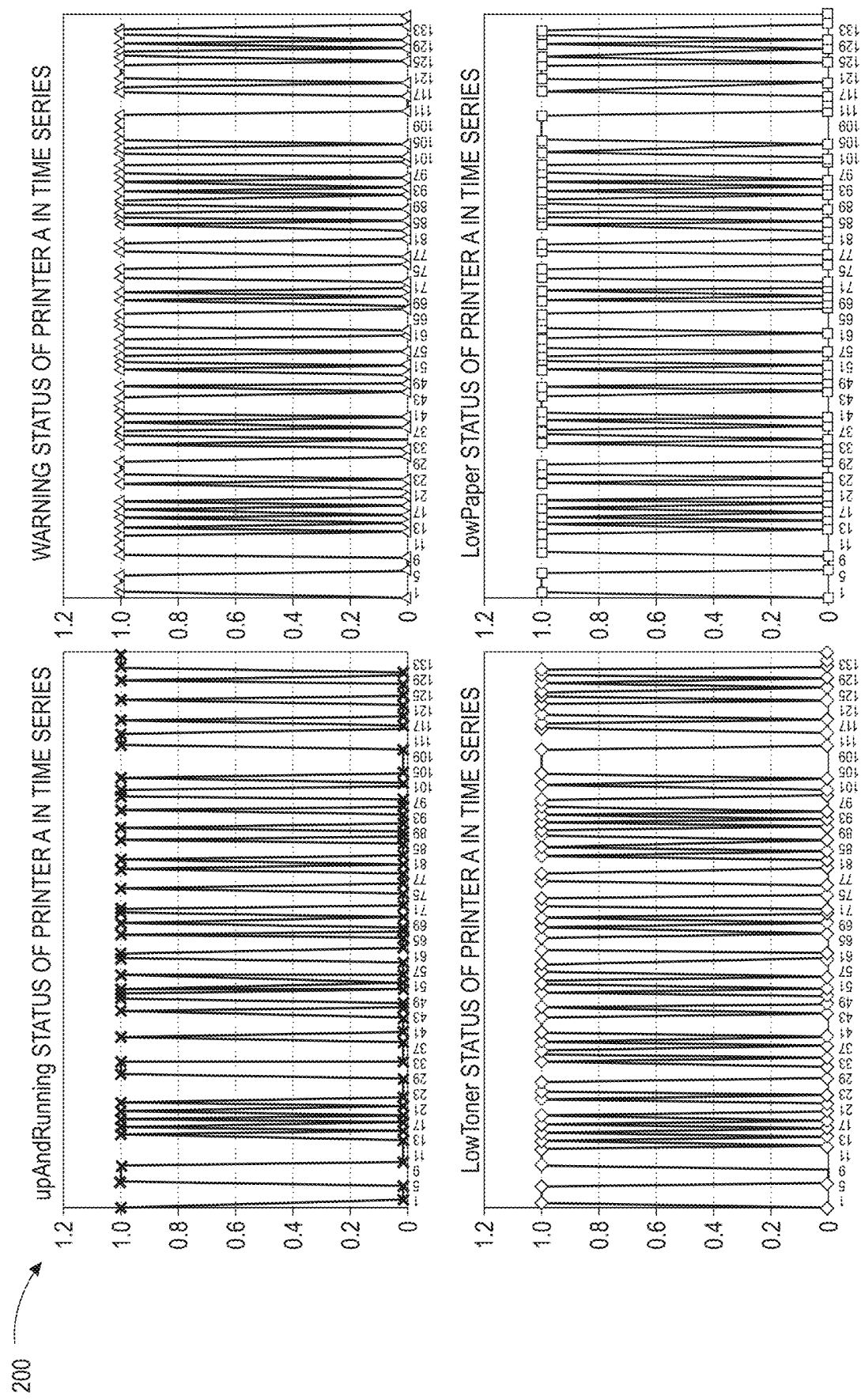
FIG. 10 shows a polling timeline for different print status alerts in a printer.

FIG. 9 illustrates an example of a clustering applied to diagnose a cycled print status problem to detect false alerts. The herein-described clustering method is applied to a printer (described as printer A) with the cycled print status data and the result is shown in FIG. 9. As seen in the figure, the printer shows two distinct groups with the same print status such as "lowToner" and "lowPaper". The cluster in the top left in FIG. 9 belongs to the warning state while the cluster in the bottom left belongs to "upandRunning" (normal) state. Looking at this further in the order of the polling timeline 200 of FIG. 10, it is clear that the printer has an inconsistent status response which can result in a possible false alert. The automatic clustering of historical data in a specific printer or printers provides user with the better understanding of print status and alerts. From this clustered result, the described systems and methods can automatically determine if the polled print status is a consistent problem (true alert) or a possible false alert. This feature facilitates providing the CSE a firsthand understanding of the print alerts based on historical data among the fleet of printers that they are managing. I.e., the CSE does not need to look at the database tables manually to check the historical print status problems described above.

TABLE 2

Example of Printer Status History Table (partial) in XDM database that store print status and alerts

| PrinterID_PollDate | Service Request | Offline | No Toner | Low Toner | Paper Jam | Overdue Maint | ... |
|---|---|---|---|---|---|---|---|
| 1124 11/09/2015 | 0 | 0 | 0 | 0 | 0 | 0 | |
| 1148 11/09/2015 | 0 | 0 | 0 | 0 | 0 | 0 | |
| 1164 11/09/2015 | 1 | 0 | 1 | 0 | 0 | 0 | |
| 1168 11/09/2015 | 1 | 0 | 0 | 0 | 1 | 0 | |
| ... | | | | | | | |

Figure 11:
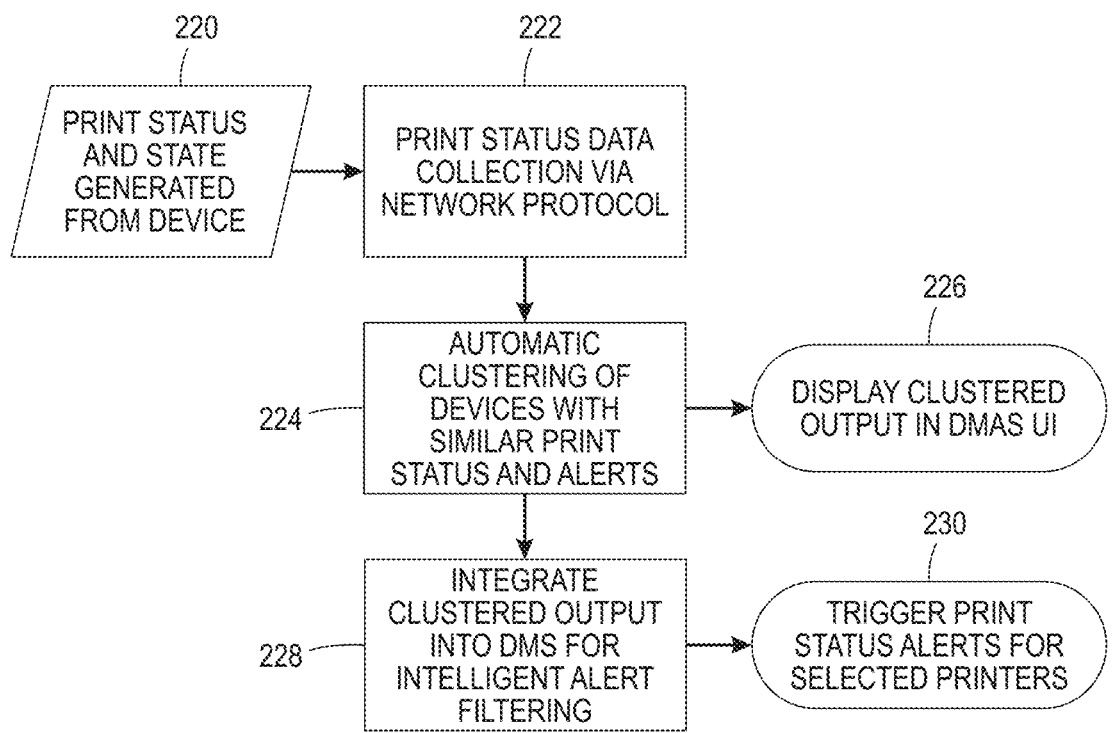
FIG. 11 illustrates a method of automatically grouping print status alerts in XDM, in accordance with one or more features described herein.

FIG. 8 shows a depiction 170 of status alerts rate (sorted by frequency) in Group 2 and Group 4 generated from Automatic Grouping Method using a plurality of printers such as are shown in Table 2. Table 2 shows an example of current printer status history data that has been collected in FIG. 11 illustrates a method of automatically grouping print status alerts in XDM, in accordance with one or more features described herein. In conventional grouping methods, some printers are grouped based on the severity levels described in FIG. 6 (e.g. Error and Warning). The herein-described methods and systems can automatically group a fleet of devices and their performance based on the historical data, which facilitates providing users with a dynamic view of the fleet of printer groups that have similar print status or performance levels. The method generates a group or subgroups automatically based on common print statuses and alert levels using the print status data collected at a given time, or over a certain period of time (historical data). With this bottom up approach, users have a much better understanding of the performance of the fleet of devices that they are managing. In one embodiment, an unsupervised clustering technique is used to group devices.

Some examples of use cases of such clustering output in XDM include, without being limited to: a user may break the clustered group of printers into subgroups with a specific print status alert; a CSE can examine the clustered groups with similar print status when generating a service strategy; the clustered groups can be utilized as an alert filtering option in XSM or any other status filtering option in XDM; the clustered print status for specific printer(s) can be used to provide an indication of false alerts.

Accordingly, at 220, print status and state is generated at each of a plurality of printing devices in a fleet of devices. At 222, print status data is collected via a network protocol or the like. At 224, devices with similar print statuses and alerts are automatically clustered. At 226, the clustered output result is displayed on the user interface of the DMA. At 228, the clustered output result is integrated into the DMA for intelligent alert filtering. At 230, print status alerts are triggered for selected printers.

With regard to print status data collection at 222, DMA such as XDM allows a user to discover devices and collect data from the device on scheduled intervals via its network discovery protocol. Examples of data collected from the device include device configuration, settings, meters, supply levels and alerts. The printer status is retrieved and updated at scheduled configurable intervals and stored in the database in printer, application server and/or main server. The severity of the print state related to the given print status is also retrieved from the device and stored in the database at scheduled intervals. An example of printer tables in XDM database that store print status and alerts is shown in Table 2. XDM users can manage devices and collect data mentioned above at predefined schedules. Since the automatic grouping utilizes an unsupervised machine learning technique, there is no need for determining the ground truth of the print state data.

With regard to the automatic clustering of devices at 224, automatic clustering of status alerts of devices is performed utilizing a hierarchical block clustering method, as discussed with regard to FIG. 7.

Figure 12:
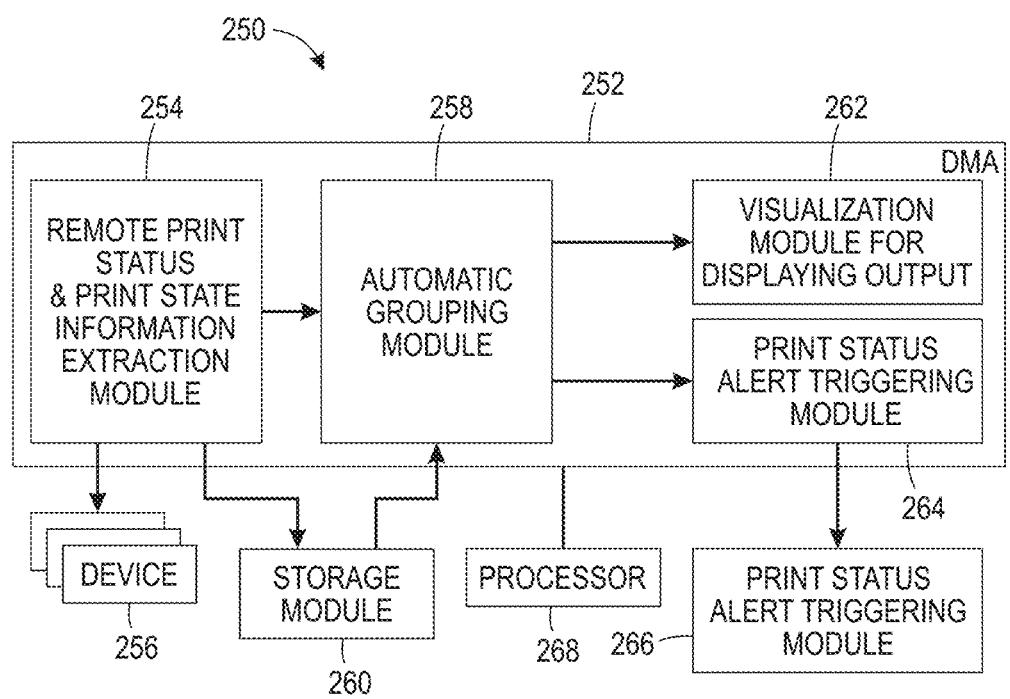
FIG. 12 illustrates a system for integrating the herein-described automatic grouping workflow into existing DMAs, in accordance with various aspects described herein.

FIG. 12 illustrates a system 250 for integrating the herein-described automatic grouping workflow into existing DMAs, such as is performed at 228 (FIG. 11), in accordance with various aspects described herein. The clustered output is displayed in XDM user interface (UI) to inform users about the devices with the similar print status. For example, the grouping output shown in FIG. 7 can be displayed in XDM UI page when a user selects the automatic grouping option.

The system comprises a DMA 252 that includes a remote print status and print state information extraction module 254, which receives state and status information from one or more devices 256. The extraction module 254 forwards the state and status information to an automatic grouping module 258 for grouping. In one embodiment, the state and status information is routed through a storage device or memory 260 en route to the automatic grouping module. Once the state and status information has been used to group devices into one or more groups or subgroups, the grouped device information is sent to a visualization module 262 for display as output. The grouped information is also sent to a print status alert triggering module 264, which sends an instruction to a print status alert processing module 260 to output an alert to a user. The alert may indicate that one or more groups of devices requires servicing.

The system 250 also comprises a processor 268 that executes one or more computer executable instruction, which may be stored in the memory 260. In one embodiment, the processor is responsible for executing the various modules described in FIG. 12.

It will be appreciated that the method of FIG. 1 can be implemented by a computer (not shown), which comprises a processor (such as the processor 268) that executes, and a memory (such as the memory 260) that stores, computer-executable instructions for providing the various functions, etc., described herein.

The computer can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer can include a processing unit 268, a system memory 260, and a system bus (not shown) that couples various system components including the system memory to the processing unit. The processing unit can be any of various commercially available processors. Multiple microprocessors and/or multi-core processor architectures also can be used as the processing unit.

The computer typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer through an input device (not shown) such as a keyboard, a pointing device, such as a mouse, stylus, voice input, or graphical tablet. The computer can operate in a networked environment using logical and/or physical connections to one or more remote computers, such as a remote computer(s). The logical connections depicted include a local area network (LAN) and a wide area network (WAN).

Such networking environments are commonplace in offices, enterprise-wide computer networks, intranets and the Internet.

Figure 13:
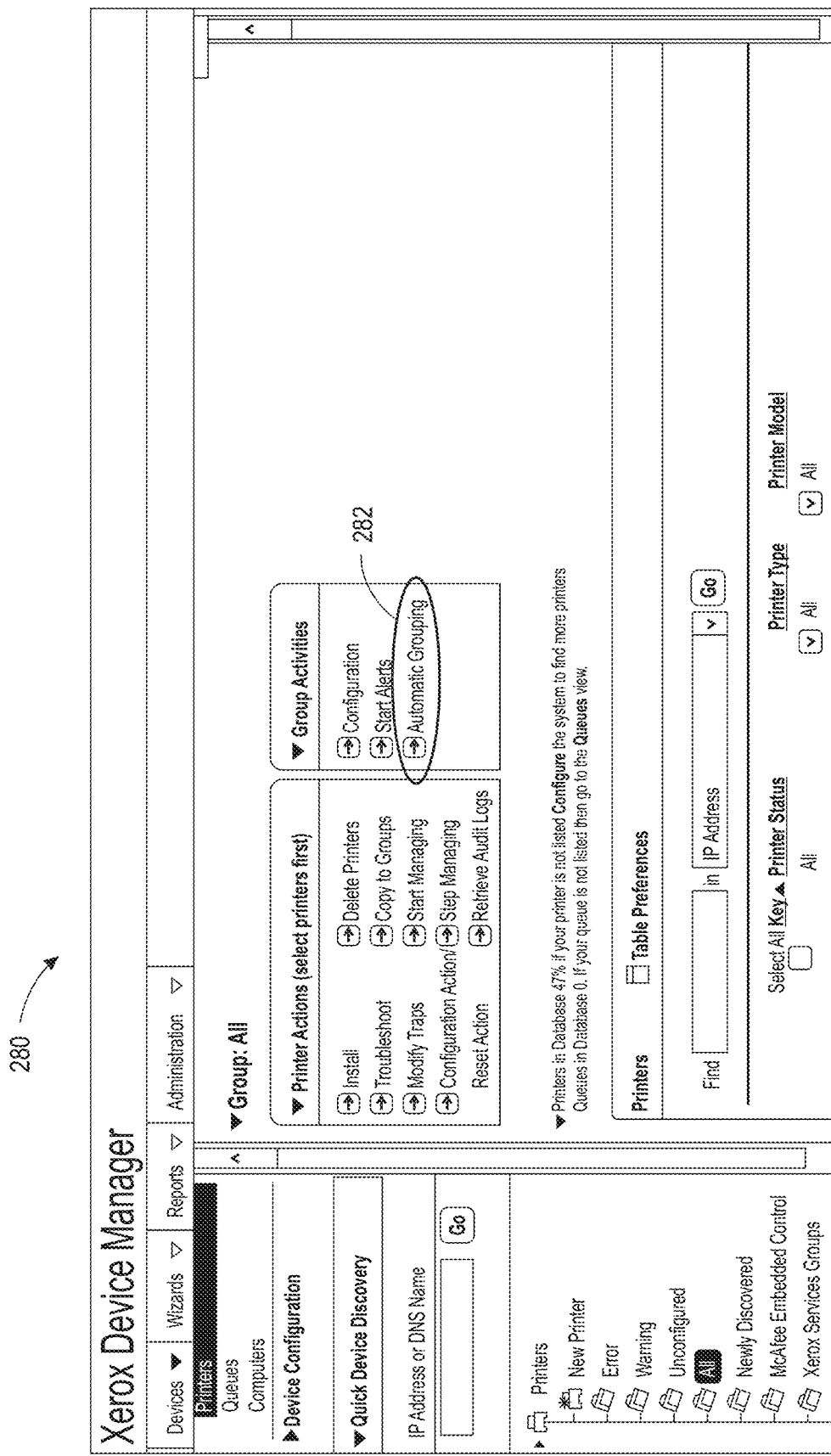
FIG. 13 shows a screen shot with an example of an automatic grouping option implemented in the XDM user interface (UI).
Figure 14:
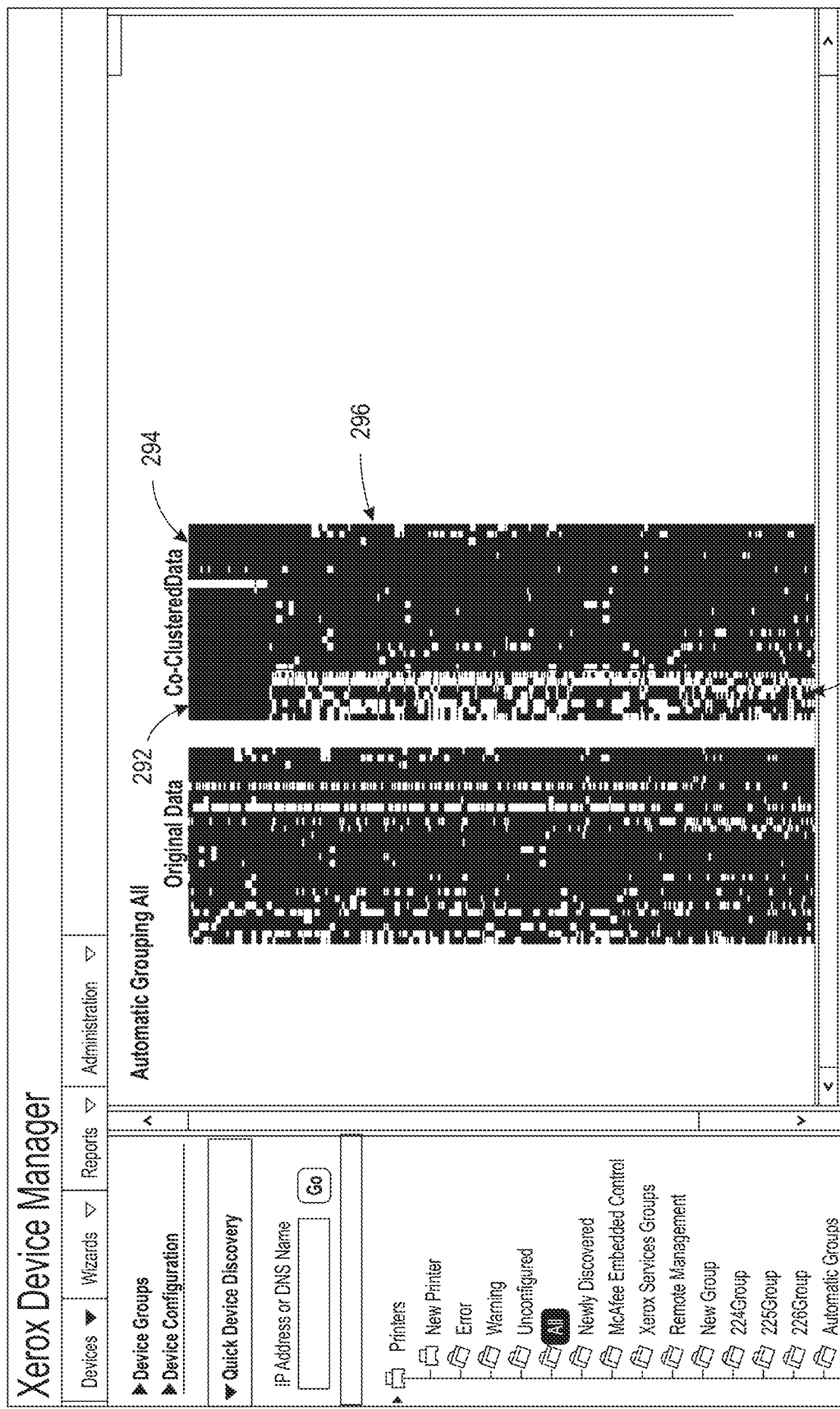
FIG. 14 illustrates an example of clustered (grouped) output displayed in a UI page.
Figure 15:
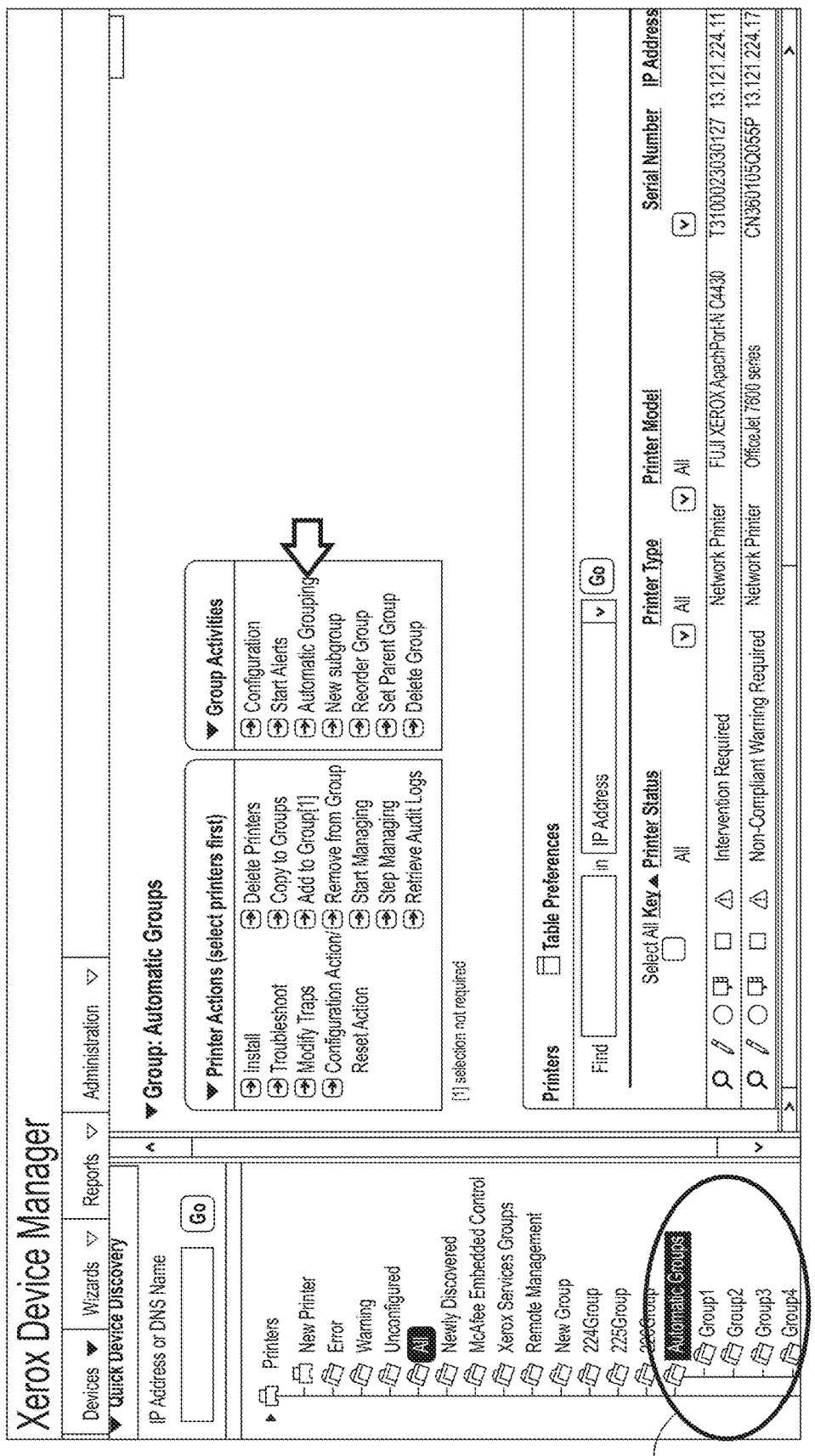
FIG. 15 illustrates subgroups of devices from the module as generated by the automatic grouping module.

FIG. 13 shows a screen shot 280 with an example of an automatic grouping option implemented in the XDM UI. When a user selects the automatic grouping option 282 for the group of all devices that the user is managing, the automatic grouping module (FIG. 12) is executed and the clustered (grouped) output is displayed in the XDM UI page as shown in FIG. 14, which shows device clusters 290, 292, 294, and 296. The automatic grouping module also automatically generates subgroups 300 of devices from the module as shown in FIG. 15.

Figure 16:
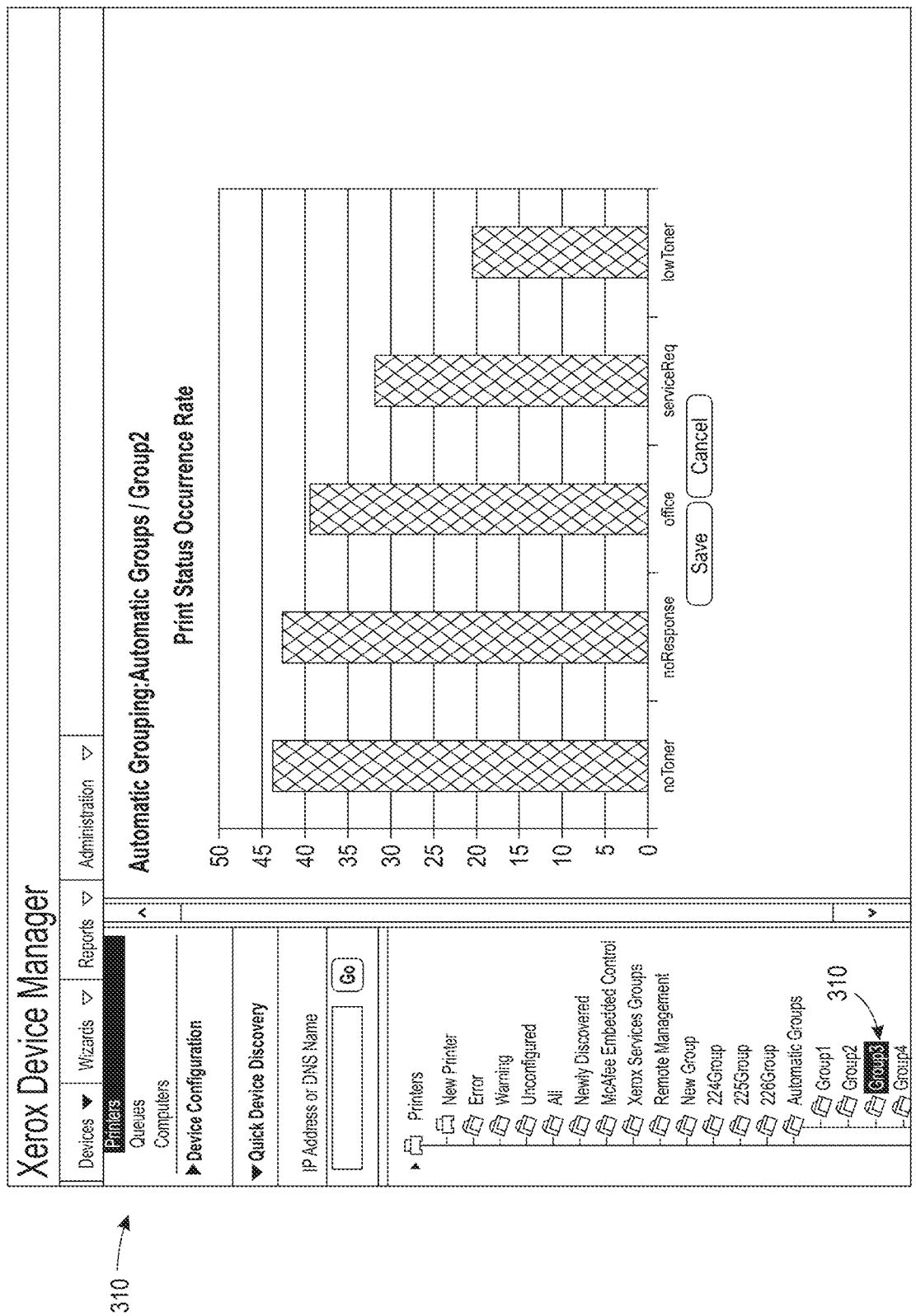
FIG. 16 shows a detailed view of print status occurrence rate screenshot for a selected subgroup, in accordance with various embodiments described herein.
Figure 17:
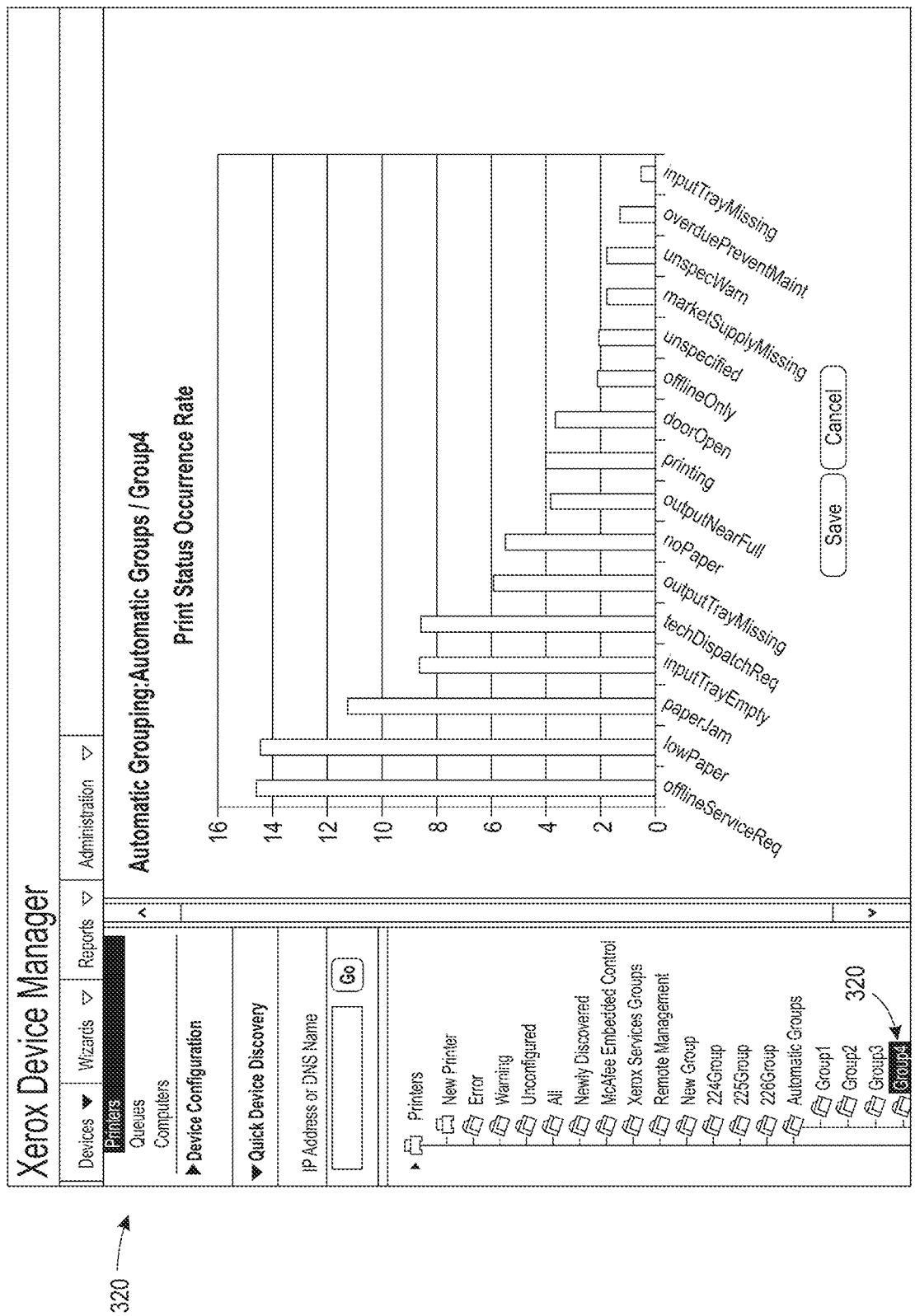
FIG. 17 shows a detailed view of print status occurrence rate screenshot for another selected subgroup, in accordance with various embodiments described herein.

FIG. 16 shows a detailed view of print status occurrence rate screenshot for a selected subgroup 310, in accordance with various embodiments described herein. FIG. 17 shows a detailed view of print status occurrence rate screenshot for another selected subgroup 320, in accordance with various embodiments described herein. When the user selects each subgroup created by the automatic grouping module, the performance of the subgroup of devices is summarized in print status graph view in the XDM UI. The performance can also be summarized in a Dashboard view in the XDM UI. The clustered subgroup can additionally be integrated into a print status alert system in DMAs to trigger print status alerts. The input of such clustering module can be any specific device or multiple devices. This described clustering method is not limited to print status diagnostic use cases in XDM. The method can be extended to many different use cases in DMAs to provide overall performance or summary views of any chosen areas in XDM.

The exemplary embodiments have been described. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for automatically grouping print status alerts for a plurality of printing devices, comprising:
   receiving print status data and print state data, which comprises alert information for each of the plurality of printing devices, from each of a plurality of printing devices in a fleet of devices;
   retrieving print status bits from each device;
   comparing the retrieved print status bits to one or more pre-generated error state masks to determine a state of each device;
   automatically clustering devices with similar print statuses and alerts;
   displaying the clustered output result on a user interface of a device management application (DMA);
   integrating the clustered output result into the DMA;
   executing a print status alert module that generates automated print status alerts for printers identified during clustering;
   outputting the automated print status alerts for display on the user interface.

2. The method according to claim 1, further comprising executing a print status module configured to:
   retrieve print status bits from each device on scheduled intervals;
   pre-generate a list of print status ID type masks each comprising at least one status bit;
   identify all print status bits that match a print status ID mask;
   display each identified print status bit in an order in which the print status bit was identified.

3. The method according to claim 1, further comprising obtaining print state level information by:
   determining whether or not to generate an indication of an error state, warning state or normal state;
   if the comparison indicates that the print status shows an error, displaying an error indication; and
   if the comparison does not indicate that the print status shows an error, comparing the print status to a warning state mask.

4. The method according to claim 3, further comprising:
   if the comparison indicates that the print status shows a warning, displaying the warning indication on a user interface;
   if the print status does not match either of the warning state mask or the error state mask, displaying a "normal" status indication on the user interface.

5. The method according to claim 1, wherein the print status data collected from the devices includes information describing one or more of:
   device configuration and settings;
   usage information;
   supply levels; and
   alerts.

6. The method according to claim 1, wherein the automatic clustering of devices is performed via a hierarchical block clustering module.

7. The method according to claim 1, further comprising generating a group or subgroups of devices automatically based on common print statuses and alert levels using the print status data collected at a given time, or over a certain period of time.

8. A system that facilitates automatically grouping print status alerts for a plurality of printing devices, comprising:
   a remote print status and print state information extraction module configured to receive print status data and print state data from each of a plurality of printing devices in a fleet of devices;
   an automatic grouping module that automatically clusters devices having similar print statuses and alerts;
   a user interface configured to display a clustered output result; and
   a processor configured to:
   retrieve print status bits from each device;
   compare the retrieved print status bits to one or more pre-generated error state masks to determine a state of each device;
   integrate the clustered output result into a device management application (DMA);
   execute a print status alert module that generates clustered print status alerts for printers identified during clustering; and
   output the clustered print status alerts for display on the user interface.

9. The system according to claim 8, wherein the processor is further configured to execute a print status module configured to:
   retrieve print status bits from each device on scheduled intervals;
   pre-generate a list of print status ID type masks each comprising at least one status bit;
   identify all printing devices having print status bits that match a print status ID type mask;
   display each identified print status bit in an order in which the print status bit was identified.

10. The system according to claim 8, wherein the processor is further configured to obtain print state level information by:
   determining whether or not to generate an indication of an error state, warning state or normal state;
   if the comparison indicates that the print status shows an error, displaying an error indication; and
   if the comparison does not indicate that the print status shows an error, comparing the print status to a warning state mask.

11. The system according to claim 10, wherein the processor is further configured to:
   if the comparison indicates that the print status shows a warning, display the warning indication on the user interface;
   if the print status does not match either of the warning state mask or the error state mask, display a "normal" status indication on the user interface.

12. The system according to claim 8, wherein the print status data and print state data received from the devices includes information describing one or more of:
   device configuration;
   device settings;
   usage information;
   supply levels; and
   device alerts.

13. The system according to claim 8, wherein the processor is further configured to execute a hierarchical block clustering module when clustering devices.

14. The system according to claim 8, wherein the processor is further configured to generate a group or subgroups of devices automatically based on common print statuses and alert levels using the print status data collected at a given time, or over a certain period of time.

15. A processor configured to automatically group print status alerts for a plurality of printing devices, the processor being configured to:
   receive print status data and print state data, which comprises alert information for each of the plurality of printing devices, from each of a plurality of printing devices in a fleet of devices;
   retrieve print status bits from each device;
   compare the retrieved print status bits to one or more pre-generated error state masks to determine a state of each device
   automatically cluster devices with similar print statuses and alerts;
   display the clustered output result on a user interface of the device management application (DMA);
   integrate the clustered output result into the DMA;
   execute a print status alert module that generates automated print status alerts for printers identified during clustering;
   output the automated print status alerts for display on the user interface.

16. The processor according to claim 15, wherein the processor is further configured to execute a print status module configured to:
   retrieve print status bits from each device on scheduled intervals;
   pre-generate a list of print status ID type masks each comprising at least one status bit;
   identify all print status bits that match a print status ID mask;
   display each identified print status bit in an order in which the print status bit was identified.

17. The processor according to claim 15, wherein the processor is further configured to obtain print state level information by:
   determining whether or not to generate an indication of an error state, warning state or normal state;
   if the comparison indicates that the print status shows an error, displaying an error indication; and
   if the comparison does not indicate that the print status shows an error, comparing the print status to a warning state mask.

18. The processor according to claim 17, wherein the processor is further configured to:
   if the comparison indicates that the print status shows a warning, display the warning indication on a user interface;
   if the print status does not match either of the warning state mask or the error state mask, display a "normal" status indication on the user interface.

19. The processor according to claim 15, wherein the print status data and print state data collected from the devices includes information describing one or more of:
   device configuration;
   device settings;
   usage information;
   supply levels; and
   device alerts.

20. The processor according to claim 15, wherein the processor is further configured to execute a hierarchical block clustering module when performing automatic clustering of devices.

21. The processor according to claim 15, wherein the processor is further configured to generate a group or subgroups of devices automatically based on common print statuses and alert levels using the print status data collected at a given time, or over a certain period of time.

* * * * *